United States Patent
Nitz et al.

(10) Patent No.: US 8,532,901 B2
(45) Date of Patent: Sep. 10, 2013

(54) METHOD FOR AUTOMATICALLY DECELERATING A VEHICLE TO AVOID COLLISION OR TO REDUCE THE CONSEQUENCES OF A COLLISION

(75) Inventors: Gregor Nitz, Olching (DE); Peter Zahn, Herrsching A. Ammersee (DE); Philipp Reinisch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/562,845

(22) Filed: Jul. 31, 2012

(65) Prior Publication Data

US 2012/0296542 A1   Nov. 22, 2012

Related U.S. Application Data

(63) Continuation of application No. PCT/EP2011/051764, filed on Feb. 7, 2011.

(30) Foreign Application Priority Data

Feb. 9, 2010   (DE) .......................... 10 2010 007 252

(51) Int. Cl.
    *B60T 7/12* (2006.01)
(52) U.S. Cl.
    USPC ........................................... 701/70; 340/467

(58) Field of Classification Search
    USPC ............ 701/45, 301, 476, 70, 110; 180/271, 180/178; 340/435–438, 903, 467; 342/455; 324/160
    See application file for complete search history.

(56) References Cited

U.S. PATENT DOCUMENTS

| | | | |
|---|---|---|---|
| 5,983,161 A * | 11/1999 | Lemelson et al. ............ | 701/301 |
| 7,769,498 B2 * | 8/2010 | Isaji et al. ........................ | 701/1 |
| 2003/0149530 A1 * | 8/2003 | Stopczynski ................. | 701/301 |
| 2004/0122576 A1 * | 6/2004 | Sorrells .......................... | 701/50 |
| 2005/0114000 A1 * | 5/2005 | Cashler .......................... | 701/45 |
| 2009/0037055 A1 | 2/2009 | Danner et al. | |

FOREIGN PATENT DOCUMENTS

DE   10 2004 062 496 A1   7/2006

* cited by examiner

*Primary Examiner* — Marthe Marc-Coleman
(74) *Attorney, Agent, or Firm* — Crowell & Moring LLP

(57) ABSTRACT

A method is provided for automatically decelerating a vehicle to avoid a collision or reduce the consequences of a collision with a detected collision object, wherein, at a determined intervention point-in-time, a brake system of the vehicle is automatically triggered such that a deceleration of the vehicle is caused, and wherein an automatic deactivation of the automatic braking intervention can take place by an increased actuation of the accelerator. A deactivation is carried out as a function of an override maneuver that depends on the actual driving dynamics, particularly an actuation of the accelerator that depends on the actual driving dynamics.

17 Claims, 1 Drawing Sheet

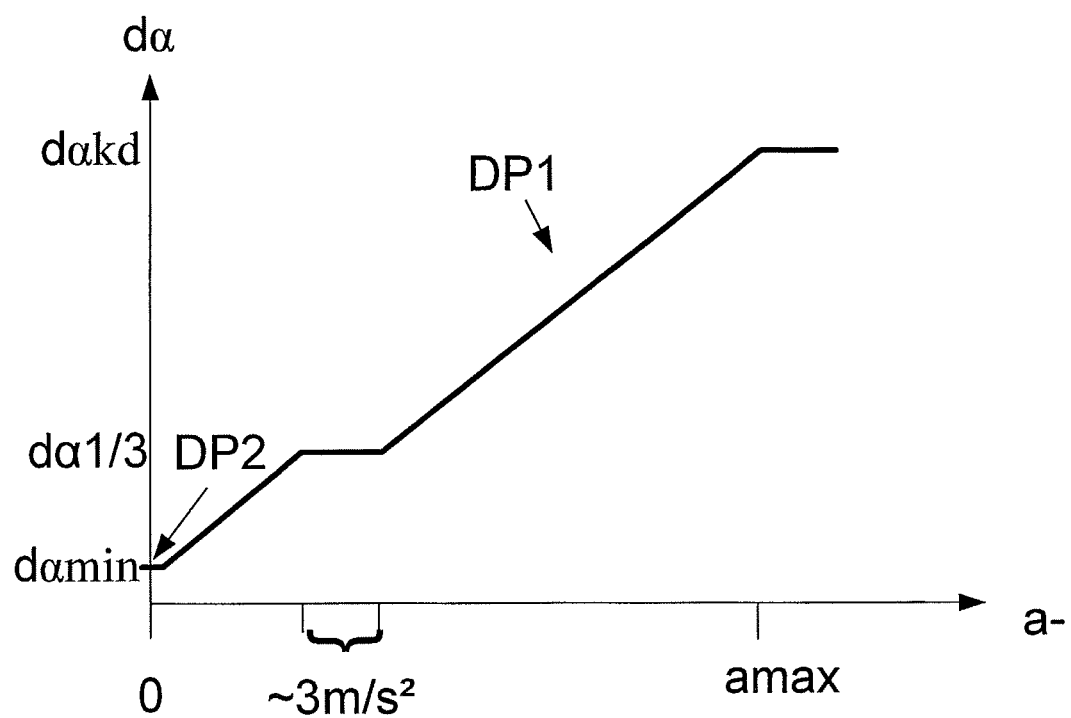

METHOD FOR AUTOMATICALLY DECELERATING A VEHICLE TO AVOID COLLISION OR TO REDUCE THE CONSEQUENCES OF A COLLISION

This application is a continuation of PCT International Application No. PCT/EP2011/051764, filed Feb. 7, 2011, which claims priority under 35 U.S.C. §119 from German Patent Application No. DE 10 2010 007 252.4, filed Feb. 9, 2010, the entire disclosures of which are herein expressly incorporated by reference.

BACKGROUND AND SUMMARY OF THE INVENTION

The invention relates to a method of automatically decelerating a vehicle to avoid a collision or to reduce the consequences of a collision, wherein, at a determined intervention point-in-time, a brake system of the vehicle is automatically triggered such that a deceleration of the vehicle is caused, and wherein an automatic deactivation of the automatic braking intervention takes place by an increased actuation of the accelerator.

Modern driver assistance systems are capable of completely preventing an imminent collision or at least minimizing the consequences of a collision by an autonomously initiated full brake application. By means of a suitable sensor system (radar, lidar, image processing) or the evaluation of vehicle-to-vehicle communication, these systems detect the vehicle environment and determine possible collision objects. When a collision is imminent, a full deceleration will be initiated at a determined intervention point-in-time.

A faulty calculation of the intervention point-in-time or, in rare cases, also faulty sensor data may lead to an undesired and incomprehensible intervention of the emergency braking system. For these cases, corresponding mechanisms can be implemented by which the driver can override the system interventions. Overriding may be accomplished by the actuation of keys, the accelerator (pedal), or the actuation of the kick-down switch in the accelerator. An overriding of the system intervention by an (increased) actuation of the accelerator is known, for example, from German Patent document DE 10 2004 062 496 A1.

In principle, the actuation of the accelerator represents a particularly intuitive type of overriding because it corresponds to the logical counter effect to a braking intervention. However, in different driving situations, the overriding mechanisms known for this purpose may lead to faulty interpretations of the overriding intention. If the accelerator is selected as an overriding mechanism, an unintentional actuation may also erroneously be interpreted as an intention to override. It was specifically determined that, in the event of a hard and mainly unexpected braking, drivers have a tendency to "fall" into the accelerator. In these cases, a mere recognition of the accelerator actuation would therefore not correspond to an actual intention to override.

If the actuation of the kick-down switch is selected as an overriding mechanism, the driver is expected to accept a sometimes extensive and less intuitive amount of accelerator travel for overriding the system. This accelerator travel may additionally have an undesirably accelerating effect on the vehicle and unnecessarily consumes time until the intention to override is recognized. This applies particularly to situations in which a slight warning braking or an acoustic warning had already been activated. In this case, an unintended accelerator actuation would not be expected.

It is an object of the invention to provide a method of automatically decelerating a vehicle that is improved with respect to the above-mentioned disadvantages in order to avoid a collision or to reduce the consequences of a collision.

This and other objects are achieved by a method of operating a driver assistance system that automatically decelerates a vehicle to avoid a collision or reduce the consequences of a collision with a detected collision object, wherein, at a determined intervention point-in-time, a brake system of the vehicle is automatically triggered such that a deceleration of the vehicle is caused, and wherein an automatic deactivation of the automatic braking intervention takes place by an increased actuation of the accelerator. A deactivation is carried out as a function of an override maneuver that depends on the actual driving dynamics, particularly an actuation of the accelerator that depends on the actual driving dynamics.

The invention starts out from a conventional method of automatically decelerating a vehicle to avoid a collision or reduce the consequences of a collision with a detected collision object, wherein, in the event of an imminent collision, at a determined intervention point-in-time, a brake system of the vehicle is automatically triggered such that a deceleration of the vehicle is caused. Even before the intervention point-in-time, a driver warning can be triggered at a determined warning point-in-time in order to draw a driver's attention to the danger of a collision at an early point-in-time. In this case, the warning to the driver is emitted so early that it will still be possible for the driver to independently initiate a corresponding driver reaction for avoiding the collision.

The invention is based on the recognition that an overriding of the system intervention, which is adapted to the momentary deceleration, can eliminate the above-mentioned disadvantages. While taking into account this recognition, the method according to the invention is characterized in that an overriding of the automatic system intervention or a deactivating of the automatic braking intervention is carried out as a function of an overriding maneuver depending on the actual driving dynamics, particularly an actuation of the accelerator that depends on the actual driving dynamics.

Since an evaluation of the actual deceleration of the vehicle can be carried out for judging the driving dynamics, it makes sense to carry out an overriding of the automatic system intervention or a deactivating of the automatic braking intervention as a function of an actuating intensity of the accelerator that depends on the actual deceleration of the vehicle. A deactivation of the automatic braking intervention will advantageously be carried out when, after the activation of an automatic braking intervention, the accelerator is actuated by more than a specified first differential pedal angle that depends on the actual deceleration. Advantageously, it should be taken into account that the required differential pedal angle is always calculated starting from the remaining accelerator travel (thus, the difference between the accelerator angle before the braking or at the point-in-time of the braking and the limit stop). The correspondingly specified first differential pedal angles may be stored, for example, in a characteristic diagram.

The first differential pedal angle that is dependent on the actual deceleration can advantageously be specified as follows: If the vehicle brakes with a slight deceleration, advantageously even a slight accelerator actuation will be sufficient for signaling an intention to override; i.e. in the case of slight decelerations, a small first differential pedal angle can also be specified as a first differential pedal angle. However, if the vehicle brakes with a full deceleration, the intention to override is recognized only on the basis of a hard accelerator application or the actuation of the kick-down switch, and an automatic deactivation of the braking intervention will be carried out; i.e., in the case of large decelerations (especially a full deceleration), a large or larger first differential pedal angle than at slight decelerations can be specified as the first differential pedal angle.

A linear course is appropriate for modeling the range situated in-between, but any other (functional or formula-type) link can also be implemented. This means that, in an advantageous further development of the invention, the first differential pedal angle to be exceeded for deactivating the automatic braking intervention is specified as a function of the actual deceleration such that, at least within a specified deceleration range, the first differential pedal angle to be exceeded is specified to be the larger, the greater the actual deceleration of the vehicle.

If the collision avoidance system or method of automatically decelerating the vehicle for avoiding a collision is further developed such that, at a specified warning point-in-time, which is before the intervention point-in-time, a visual, acoustic or haptic driver warning is already emitted to the diver in order to warn the latter of the impending danger, the automatic driver warning can be deactivated by the driver's corresponding behavior. Advantageously, it also makes sense here to evaluate the actuation of the accelerator pedal particularly such that analogous to the deactivation of the braking intervention, an automatic deactivation of the driver warning is carried out when a specified second differential pedal angle is reached or exceeded. However, as a rule, a (more intensive) actuation of the accelerator by a few percent will be sufficient.

In comparison to the previous state of the art, the possibility of overriding the system as a function of the deceleration permits a faster and less faulty identification of the driver's actual intention to override. By means of the targeted observation of the accelerator, the mechanism described here reduces the probability of a faulty triggering also in the case of warnings and partial braking and thereby contributes significantly to an increased system acceptance.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE illustrates an embodiment of a characteristic diagram for representing a differential pedal angle $d\alpha$ which is required for deactivating a system intervention and a driver warning and depends on the actual deceleration a− of the vehicle.

DETAILED DESCRIPTION OF THE DRAWING

Referring to the FIGURE, as long as only an acoustic driver warning is emitted, which takes place even before an actual braking intervention, an increase of the accelerator angle by a few percent is already sufficient (see $d\alpha$min) for deactivating the driver warning and preventing the system from carrying out the emergency braking. This is illustrated by Point DP2 in the characteristic curve. However, as soon as an automatic braking intervention takes place, which leads to a deceleration a− of the vehicle, a harder actuation of the accelerator will be necessary for the overriding or deactivating. Even a warning braking with a slight deceleration of approximately 3 m/s$^2$ requires approximately one third $d\alpha\frac{1}{3}$ of the remaining accelerator travel or of the remaining pedal angle, whereas a full brake application amax can be overridden only by an almost complete depressing of the accelerator $d\alpha$kd and an actuation of the kick-down switch. In this example, a linear course was defined for the modeling of the range situated in-between, in which case, any other link between the actual deceleration a− and the first differential pedal angle $d\alpha$ would also be implementable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a driver assistance system that automatically decelerates a vehicle to avoid a collision or reduce consequences of a collision with a detected collision object, the method comprising the acts of:
    causing an automatic braking intervention at a determined intervention point-in-time to decelerate the vehicle; and
    deactivating the automatic braking intervention based on an override maneuver dependent on actual driving dynamics of the vehicle, wherein the deactivation is carried out as a function of an actuation of the accelerator that depends on an actual deceleration of the vehicle.

2. The method according to claim 1, wherein the deactivation of the automatic braking intervention is carried out when, after the automatic braking intervention is caused, the accelerator is actuated by more than a specified first differential pedal angle dependent on the actual deceleration of the vehicle.

3. The method according to claim 2, wherein the first differential pedal angle to be exceeded for deactivating the automatic braking intervention is specified as a function of the actual deceleration of the vehicle according to at least one of the following:
    in a case of a slight deceleration, a slight first differential pedal angle is specified as the first differential pedal angle; and
    in a case of a larger deceleration, a larger first differential pedal angle than in the case of the slight deceleration is specified as the first differential pedal angle.

4. The method according to claim 3, wherein the first differential pedal angle to be exceeded for deactivating the automatic braking intervention is specified as a function of the actual deceleration of the vehicle such that, at least within a specified deceleration range, the first differential pedal angle to be exceeded becomes larger as the actual deceleration of the vehicle becomes greater.

5. The method according to claim 3, further comprising the acts of:
    at a determined warning point-in-time occurring before the intervention point-in-time, triggering a driver warning; and
    automatically deactivating the triggered driver warning when a specified second differential pedal angle is reached or exceeded.

6. The method according to claim 5, wherein the specified second differential pedal angle for deactivating the driver warning is, at a minimum, no greater than a smallest specified first differential pedal angle for deactivating the automatic braking intervention.

7. The method according to claim 2, wherein the first differential pedal angle to be exceeded for deactivating the automatic braking intervention is specified as a function of the actual deceleration of the vehicle such that, at least within a specified deceleration range, the first differential pedal angle to be exceeded becomes larger as the actual deceleration of the vehicle becomes greater.

8. The method according to claim 7, further comprising the acts of:
at a determined warning point-in-time occurring before the intervention point-in-time, triggering a driver warning; and
automatically deactivating the triggered driver warning when a specified second differential pedal angle is reached or exceeded.

9. The method according to claim 2, further comprising the acts of:
at a determined warning point-in-time occurring before the intervention point-in-time, triggering a driver warning; and
automatically deactivating the triggered driver warning when a specified second differential pedal angle is reached or exceeded.

10. The method according to claim 9, wherein the specified second differential pedal angle for deactivating the driver warning is, at a minimum, no greater than a smallest specified first differential pedal angle for deactivating the automatic braking intervention.

11. The method according to claim 1, further comprising the acts of:
at a determined warning point-in-time occurring before the intervention point-in-time, triggering a driver warning; and
automatically deactivating the triggered driver warning when a specified second differential pedal angle is reached or exceeded.

12. The method according to claim 11, wherein the specified second differential pedal angle for deactivating the driver warning is, at a minimum, no greater than a smallest specified first differential pedal angle for deactivating the automatic braking intervention.

13. A method of operating a driver assistance system that automatically decelerates a vehicle to avoid a collision or reduce consequences of a collision with a detected collision object, the method comprising the acts of:
causing an automatic braking intervention at a determined intervention point-in-time to decelerate the vehicle; and
deactivating the automatic braking intervention based on an override maneuver dependent on actual driving dynamics of the vehicle, wherein the deactivation of the automatic braking intervention is carried out when, after the automatic braking intervention is caused, the accelerator is actuated by more than a specified first differential pedal angle dependent on an actual deceleration of the vehicle.

14. The method according to claim 13, wherein the first differential pedal angle to be exceeded for deactivating the automatic braking intervention is specified as a function of the actual deceleration of the vehicle according to at least one of the following:
in a case of a slight deceleration, a slight first differential pedal angle is specified as the first differential pedal angle; and
in a case of a larger deceleration, a larger first differential pedal angle than in the case of the slight deceleration is specified as the first differential pedal angle.

15. The method according to claim 13, wherein the first differential pedal angle to be exceeded for deactivating the automatic braking intervention is specified as a function of the actual deceleration of the vehicle such that, at least within a specified deceleration range, the first differential pedal angle to be exceeded becomes larger as the actual deceleration of the vehicle becomes greater.

16. The method according to claim 15, further comprising the acts of:
at a determined warning point-in-time occurring before the intervention point-in-time, triggering a driver warning; and
automatically deactivating the triggered driver warning when a specified second differential pedal angle is reached or exceeded.

17. The method according to claim 16, wherein the specified second differential pedal angle for deactivating the driver warning is, at a minimum, no greater than a smallest specified first differential pedal angle for deactivating the automatic braking intervention.

* * * * *